United States Patent [19]

Malpass et al.

[11] E Re. 30,474

[45] Reissued Jan. 6, 1981

[54] HOT MELT SIZE AND YARN SIZED THEREWITH AND PACKAGES AND FABRICS OF SIZED YARN

[75] Inventors: Robert C. Malpass, High Point; Walter F. Illman, Greensboro; Delano M. Conklin, Burlington, all of N.C.

[73] Assignee: Burlington Industries, Inc., Greensboro, N.C.

[21] Appl. No.: 20,439

[22] Filed: Mar. 13, 1979

Related U.S. Patent Documents

Reissue of:

[64] Patent No.: 4,082,883
Issued: Apr. 4, 1978
Appl. No.: 778,080
Filed: Mar. 16, 1977

U.S. Applications:

[63] Continuation of Ser. No. 286,946, Sep. 7, 1972, abandoned.

[51] Int. Cl.[3] ..... C08K 5/05; C08K 5/10; C08K 5/13; C08L 67/02

[52] U.S. Cl. ..... 428/253; 28/178; 206/525; 260/29.2 E; 260/29.6 RW; 260/29.6 WA; 260/29.6 E; 260/29.6 ME; 260/31.2 XA; 260/33.4 R; 428/375; 528/295

[58] Field of Search ..... 260/29.2 E, 29.6 RW, 260/29.6 WA, 29.6 E, 29.6 ME, 31.2 XA, 33.4 R; 428/253, 375; 528/295

[56] References Cited

U.S. PATENT DOCUMENTS

| | | | |
|---|---|---|---|
| T871008 | 2/1970 | McSpadden . | |
| 3,049,434 | 8/1962 | Harrison | 106/210 |
| 3,057,855 | 10/1962 | Smith et al. | 528/381 X |
| 3,061,471 | 10/1962 | Brockway et al. | 428/395 |
| 3,061,472 | 10/1962 | Brockway | 427/434 X |
| 3,168,502 | 2/1965 | Sexsmith et al. | 525/330 X |
| 3,265,655 | 8/1966 | Hill | 260/29.6 ME |
| 3,466,717 | 9/1969 | Kurada | 28/28 |
| 3,546,008 | 12/1970 | Shields et al. | 117/138.8 F |
| 3,567,498 | 3/1971 | Rafferty et al. | 117/139.5 A |
| 3,636,131 | 1/1972 | Davis et al. | 260/75 S |
| 3,853,820 | 12/1974 | Vachan | 260/75 S |

FOREIGN PATENT DOCUMENTS

| | | |
|---|---|---|
| 40-14280 | 7/1965 | Japan . |
| 46-3833 | 1/1971 | Japan . |
| 48-23996 | 7/1973 | Japan . |
| 49-32745 | 9/1974 | Japan . |

OTHER PUBLICATIONS

"Exhibit A, No. 1 Taken From "Technique of Textile", vol. 41, (3-1969), *Hackh's Chemical Dictionary*, 3rd ed. (1944), p. 694.

*Primary Examiner*—Sandra M. Person
*Attorney, Agent, or Firm*—Cushman, Darby & Cushman

[57] ABSTRACT

A non-aqueous,water-soluble, quick-setting sizing composition suitable for application in the molten state to textile yarns of both continuous-filament and staple types, and for later removal by aqueous means, comprising a combination of a film-forming thermoplastic polymer with a melt-miscible viscosity reducer and solification promoter, and yarns so sized. The polymer protects and consolidates the yarn, while its companion component promotes the even application and particularly the quick set-up of the molten size. Optionally, if desired, water-soluble lubricants may also be added to increase the lubricity and flexibility of the sized yarn.

24 Claims, No Drawings

HOT MELT SIZE AND YARN SIZED THEREWITH AND PACKAGES AND FABRICS OF SIZED YARN

Matter enclosed in heavy brackets [ ] appears in the original patent but forms no part of this reissue specification; matter printed in italics indicates the additions made by reissue.

CROSS REFERENCE TO RELATED APPLICATIONS

This is a continuation of our earlier copending application Ser. No. 286,946, filed Sept. 7, 1972 and now abandoned.

BACKGROUND OF THE INVENTION

This invention relates to the sizing of textile yarns, and more particularly to melt sizing with compositions later removable by aqueous means.

The art of textile sizing contains many examples of solutions and dispersions of sizes in water and/or organic solvents. Such compositions inevitably require a slow and expensive drying step after application to yarns. A few examples are known of melt sizes, which do not require removal of solvent, these sizes being based in general upon waxes and other water-insolubles. U.S. Pat. No. 3,466,717 is directed to the application of such a wax-based melt size, removable only by non-aqueous solvents after processing. Besides this restriction, wax sizes have the further deficiency that they lack the film strength, adhesion, flexibility, and ready variability and control of melt viscosity which are inherent in the tougher polymer-based melt sizes of the present invention.

No quick-setting water-soluble melt sizes are known to exist in the art.

Polymers high enough in molecular weight to be good film formers generally give melts having excessively high viscosities and slow solidification rates. Such polymers, if applied as melt sizes, would therefore be expected to flow poorly onto and throughout the fibers of a yarn, and to require application of excessive cooling means and times for solidification. Indeed, the film-forming polymers of the present invention failed completely until the discovery of melt modifiers capable of reducing the melt viscosities and speeding the solidification of the melts to tough and non-sticky films.

SUMMARY OF THE INVENTION

The compositions of this invention comprise an intimate combination of a film-forming thermoplastic polymer and a melt-compatible non-polymeric solid modifier, optionally further combined with a yarn lubricant, which combination is readily [melt-able] *meltable*, quick-setting, essentially water- or alkali-soluble, and thus capable of melt application to and extraction by aqueous solvents from the textile filaments, yarns, and fabrics. A preferred form of the invention is a water-soluble compolymer of isophthalic acid, 5-sulfoisophthalic acid or a salt thereof, and diethylene glycol, melted with a substantial amount of adipic acid or other compositions as described hereinafter, capable of simultaneously reducing the melt viscosity and increasing the setting [of] *or* freezing rate of the combined melts. This combination provides for rapid application of size to the yarn, eliminates the need to dry or otherwise remove solvent from the sized yarn, and permits the subsequent aqueous extraction of the size.

The heart of the invention lies in the capability of the melt modifiers to reduce the viscosity of the polymer melt and at the same time to effect a surprising and marked increase in its setting rate.

It is accordingly an objective of this invention to provide a textile size composition capable of melt application to and aqueous removal from textile materials.

It is a further object to provide a hot-melt size which sets after application at a rate sufficient for application and windup at high yarn speeds.

It is a further object to provide a hot-melt size having viscosity characteristics adapted to smooth, uniform, and optimally penetrating application of the size to a variety of textile fibers. It is a further object to provide a hot-melt size having superior flexibility, good adherency, and high resistance to blocking on yarn packages.

It is a further object to provide a hot-melt size having superior capability for laying the hairness of spun yarns.

The achievement of these and other objectives is shown hereinafter.

DETAILED DESCRIPTION

In its broadest sense the melt size of this invention is an intimate combination, preferably made by melting its components together with stirring, of a film-forming thermoplastic polymer and a melt-miscible solid modifier, which modifier has the highly desirable properties of reducing the viscosity of the melt while simultaneously promoting its rate of solidification and its freedom from tackiness when cooled. The combination has the further property of being substantially water- or aqueous alkali-soluble and therefore of being removable from the yarn, or fabrics made from it, by aqueous scouring.

While the components are preferably blended by melting in a separate step prior to final melting for application to yarn, other methods may also be used, such as solution in a common solvent and removal of the solvent by evaporation or other means. It is believed to be essential that the blend be intimate at the time of application to yarn, i.e., essentially a solution of the modifier in the molten polymer.

The size composition of the invention may be used in various ways. However, a preferred way of using the composition involves utilizing a grooved rotating roller which is heated while a block of the melt size is forced against the roller to be transferred to yarn passing through the grooves of the roller.

The melt sizes may suitably be made and used by melting the components together and directly applying the melts to yarn. This operation, however, is likely to involve long retention times in the molten state of undesirably large bodies of molten size. In this molten state an unfavorable degree of reaction, such as transesterification, may occur between the melt components. A preferred procedure, therefore, is to cast the preliminary melts in sticks, blocks, or sheets of such dimensions as to permit their controlled incremental melting when an edge of the casting is pressed against the grooved hot roll applicators of the copending application *now Reissue 29,287, granted July 5, 1977.*

An alternative and sometimes preferred means for preparing the molten size, especially whenever an undesirable degree of interreaction between the polymer and the modifier is known or suspected to be likely to occur, is to melt polymer and modifier separately and blend them together, suitably under conditions of high shear, in times shorter than those required for simultaneous melting and blending.

Optionally, when a higher degree of yarn lubricity and flexibility is required than obtained with a melt made from only the aforesaid polymer and modifier, a minor proportion of melt-miscible and aqueous-extractable yarn lubricant may also be blended into the melt. The proportions of this latter component should be held at relatively low levels to prevent an adverse effect upon the solidification behavior of the size. Typical suitable lubricants for this purpose are water-soluble polyurethanes, polyethylene glycols, higher fatty acids such as stearic acid, waxes, and the like.

The heart of the invention lies in the concept of blending a selected solid modifier intimately with a suitable thermoplastic polymer, the latter high enough in molecular weight to form good films. The nature of the modifier is such that it produces a combined melt displaying a significantly reduced melt viscosity, and especially a rapid setup and absence of tackiness when the sized yarn is led away from the hot size applicator. The combination melt has the further advantage that it can be removed by aqueous means. Despite the restrictiveness of the requirements imposed on the components by the needs of the system, i.e., meltability, melt-compatibility, aqueous extractability, and, especially, rapid solidification, the known specific combinations meeting these needs are surprisingly large in number.

Thermoplastic polymers suitable for use in this invention are those displaying both water or aqueous alkali solubility and meltability, the latter accompanied by no substantial degree of thermal degradation.

It appears that to exhibit both meltability and aqueous or alkaline solubility, a polymer must possess a proper but somewhat limited in scope balance between its polar and non-polar constituents. This balance is achieved in practice primarily in copolymers, which may be made either from suitable combinations of polar and non-polar comonomers or by partial hydrolysis of homopolymers such as, for example, polymethyl acrylate.

In the context of this invention a meltable polymer is defined as one having a degree of thermoplasticity sufficient to produce adequate flow onto and among the fibers of a yarn when the hot polymer, diluted by the melted or dissolved solid modifier, is applied without significant pressure to the yarn.

The most preferred class of film-forming polymers consists of the water-dispersible or water-soluble linear copolyesters containing sulfonic or sulfonate metal or ammonium salt groups described in, for example, U.S. Pat. Nos. 3,546,008 and 3,563,942. A particularly favorable composition of this type is a water-soluble thermoplastic copolymer of isophthalic acid, 5-sulfoisophthalic acid or a salt thereof, and diethylene glycol, described in U.S. Pat. No. 3,546,008. Further details of these polymers are shown in the examples which follow.

Another group of polymers found to be effective are the thermoplastic alkali-soluble acrylic and methacrylic acid copolymers and their metal and ammonium salts having carboxylic groups sufficient in number to impart water or alkali solubility. Polymers of this type are marketed under names such as Carboset 525, tradename of B. F. Goodrich Company, this resin being described as a solid thermoplastic containing 5–10 percent of carboxyl groups.

Vinyl acetate copolymers which are meltable and alkali-soluble are also effective in the invention. Such copolymers are made by copolymerization of vinyl acetate with acids such as crotonic, acrylic, and methacrylic. Preparations of typical crotonic acid/vinyl acetate copolymers are shown in British patent specification No. 863,229 and U.S. Pat. No. 2,966,480.

Water- or alkali-soluble phosphonate copolymers such as those discussed in Vol. 2 of "Reviews in Macromolecular Chemistry" (edited by George B. Butler and Kenneth F. O'Driscoll), Marcel Dekker, Inc., 1967, page 19, are also useful in preparing melt sizes of the invention.

In general, the number of polymer classes known in the art to possess the aqueous solubility and melting properties essential to this invention is limited by the fact that these properties are somewhat mutually exclusive. Expressed otherwise, water-solubility in polymers tends to derive from the presence of numerous highly polar groups such as hydroxyl, as in polyvinyl alcohol; but large proportions of such groups raise the melting point above the decomposition point, thereby taking the polymers out of the class of thermoplastics as the term is used herein. The invention is believed applicable with any polymer having the described solubility and melting properties, whether named specifically herein or not.

Useful solid modifiers within the scope of this invention include those members of the following classes of compounds having the properties of reducing the viscosity and promoting the rate of solidification of melts of said modifiers with the aforesaid film-forming polymers; carboxylic acids, polyhydric alcohols, phenolic acids, polyhydric phenols, and partial esters of polycarboxylic acids. Other classes of modifiers which, in conjunction with suitable polymers, produce melts having the desirable properties detailed herein are also considered to fall within the concept of the invention.

The preferred solid modifiers used to lower the viscosity and raise the setting speed of the molten polymers are aliphatic dicarboxylic acids, of which adipic acid is the most preferred particularly when used with aforementioned sulfonated copolymers. The permissible upper and lower limits of the melting points of these dibasic acid modifiers appear to vary somewhat, but in general melting points between about 90°–190° C. seem to be preferred. Lower melting points evidently hurt the solidification characteristics of the combination melts, while higher melting points increase the likelihood of decarboxylation of the diacid, as well as of the transesterification and other undesirable side reactions. Besides adipic acid, other acids have given particularly promising results; succinic, suberic, azelaic, and sebacic. Suitable mixtures of the acids are also effective. It is believed that dibasic acids having slightly lower melting points than these have might be more effective with polymers which themselves have either lower melting points or a tendency toward thermal decomposition when melted. A few monobasic acids, such as benzoic acid, have the necessary physical properties and also may be used in the invention.

Another useful class of modifiers are those of the solid polyhydric alcohols such as sorbitol, mannitol, erythritol, and the like which have low enough melting points to be melted with the polymers of the invention without occurrence of excessive decomposition or transesterification reactions, and high enough to promote solidification of the molten combination. These compounds, among which sorbitol has been found the most effective in the invention, appear more subject to side reactions than the diacids, possibly because of their known tendency toward forming internal anhydrides or cyclic ethers, of which sorbitan is one example. Suitable polyhydric alcohols are believed to be those melting in the range of about 90°-175° C.

The phenolic acids are another group of melt modifiers seemingly widely effective in this invention. Members of this class include salicyclic acid, other mono- and polyhydroxy benzoic and naphthoic acids, and other like compounds. The upper melting point limit for members of this class appears to be higher than for any other class: for example, 3,5-dihydroxybenzoic acid melts at 240° C. and yet is reasonably effective. Reduced film flexibility may be a problem with the higher melting members of this class.

The effective polyhydric phenols, though seemingly limited in number for reasons other than their apparently favorable physical characteristics, are another somewhat restricted class of melt modifiers. 2,7-Naphthalenediol is one such member of the class. As with the phenolic acids, the higher melting polyhydric phenols may also be less preferred because of reduced film flexibility. The apparent ineffectiveness of some members of the class may, it is postulated, result from their well known tautomerizing tendencies.

Another group of effective modifiers, limited in number because most of the members of their class are liquids and few of the class melt high enough to promote solidification in the invention, are the partial esters of polycarboxylic acids, and especially half esters of dicarboxylic acids. Among those suitable for use in the invention are the aromatic acid esters monomethyl phthalate, monoethyl isophthalate, monoethyl terephthalate, and monopropylterephthalate. A few partial esters of aliphatic acids, especially benzyl and substituted benzyl esters, are known to melt high enough to be useful.

Other melt-size combinations of film-forming polymers and solid non-polymeric modifiers depending upon the concept of this invention for their quick setting property and capacity for aqueous removal are believed to fall within its scope.

The mechanism of action of the melt modifier is not wholly understood. The role of the modifier appears however, to be explained by the following analysis: The modifier initially serves as a substantially inert diluent and viscosity reducer for the film former. As the melt cools, the polymer, instead of undergoing the gradual hardening which is characteristic of its class of composition, solidifies quickly, completely, and without stickiness, at least on its surface. This wholly unexpected behavior is believed to result from the crystallizing modifier serving as a nucleating agent for the polymer.

Proportions by weight of film-forming polymer to modifier vary from a ratio of about 90:10 to about 50:50, with about 60:40 being preferred. Compositions with higher proportions of polymer than these tend to set too slowly while those with lower proportions tend to have inadequate film properties.

Although the preference herein is for the use of neutral or alkaline aqueous extraction media for removing the polymer/modifier sizes, acidic media are also satisfactory in cases where the sizes will dissolve therein.

A convenient method for screening prospective candidate size combinations, further detailed in the examples which follow, is to melt the components together and spread the hot melt as a film on a flat glass or similar surface. Rapid solidification and absence of tackiness at room temperature and above are immediate signs of good combinations, while sought-after flexibility may be judged readily when the film is taken from the casting surface.

Besides the yarn lubricants previously mentioned as potential third components in the melt mixtures, other agents such as antioxidants, light or heat stabilizers, coloring material, and the like may if desired be added to the molten size combination.

Further details of the invention are shown in the examples, and other combinations of components based on the concept of the invention can be found without departing from its scope.

EXAMPLE 1

U.S. Pat. No. 3,546,008 describes the preparation of a variety of linear copolyesters made from dicarboxylic acids, diols, and sulfonated dicarboxylic acids, and/or esters of the acids, by a conventional polyesterification procedure. Polymer B of Example 2 of said patent was made by polymerization, to an inherent viscosity of 0.40, of the stated proportions of dimethyl isophthalate, dimethyl 5-sodiosulfoisophthalate, and diethylene glycol. The resulting polymer, C, a resinous solid having about one sulfonated ring in 10, was ground to a coarse powder and kept in a closed container to prevent unnecessary contact with atmospheric moisture. Another polymer, D, similar to C except for having about one sulfonated ring in 25, was polymerized in the same way from adjusted proportions of the same starting materials to an inherent viscosity of 0.33.

EXAMPLE 2

A thoroughly blended mixture of 60 g of the ground polymer C of Example 1 and 40 g of adipic acid was heated and magnetically stirred at 160° C. until mixing was complete. The resulting melt had a viscosity of 950 cps at 154° C. when measured with No. 5 Brookfield spindle at 60 rpm, these being the conditions for all Brookfield viscosity measurements recorded herein. Most of the melt was poured into a Teflon mold where it solidified to a $\frac{1}{4}\times\frac{1}{2}\times$8-inch rod. A small amount of the melt was withdrawn on a pre-heated spatula and spread quickly on a sheet of Formica where it set almost instantly. A portion of the solidified melt was set aside and later found to have a glass transition point of −32° C. Still another portion was pressed between two pieces of release paper under 2200 pounds pressure at 66° C., yielding a smooth and uniform film averaging 2 mils in thickness. This film, tested on the Instron, had a tensile strength of 369 psi and elongation of 26%. The composition melted on the Fisher block at 110° C., the point where flow occurred in a small sample between two microscope cover glasses. All melting points herein recorded were taken in this manner. The film dissolved readily when stirred in water.

Melt size was applied to a 22/1, 18-tpi, 65/35 polyester/rayon yarn by pressing the molded rod against the periphery and into the grooves of a rotating aluminum roll while passing the yarn through the grooves at 300 ypm. The surface temperature of the roll was 170° C. The size lost tackiness within a few feet after leaving the roll. The size add-on was 10.1%. The sized originally extremely hairy singles yarn was virtually free of protruding hairs, stronger, more abrasion-resistant, and generally more suitable for both knitting and weaving.

EXAMPLE 3

A 50/50 polymer/modifier blend was made by melting together 50 g of Polymer D of Example 1 to 50 g of adipic acid. The Brookfield viscosity of the melt was 400 cps, the melting point was 140° C., and the setting rate was extremely fast. Applied to yarn as in Example 2, the size penetrated the yarn well, but the flexibility and freedom from hairiness of the yarn were less than optimum, indicating that the ratio of polymer to modifier was nearing its lower level of acceptability.

EXAMPLE 4

A 70/30 polymer/modifier blend was made by melting together 70 g of Polymer C of Example 1 and 30 g of adipic acid. A test film from the melt had good tensile and elongation properties, but when applied to yarn the size solidified more slowly than with the 60/40 blend. After the yarn speed was reduced the sized yarn could be taken up without blocking on the package.

EXAMPLE 5

An 80/20 polymer/modifier blend was made by melting together 80 g of Polymer C of Example 1 and 20 g of adipic acid. The melt viscosity was very high but still such that application to 65/35 polyester/rayon 22/1 yarn was possible. The set-up time, however, was so long that blocking on the package was avoided only by tripling the normal distance between the size applicator roll and take-up package.

EXAMPLE 6

A 60/40 melt was made from 60 g of Polymer C of Example 1 and 40 g of sebacic acid at 150° C. The Brookfield viscosity was 2300 cps at 140° C. The melt set rapidly when cast as a water-soluble film and, when applied to polyester/rayon yarn as in Example 21, greatly improved the physical and handling properties of the yarn.

EXAMPLE 7

A mixture of 60 g of Polymer D of Example 1 and 40 g of azelaic acid was melted together. This formulation, melting at 104° C., was applied to 20/1 spun polypropylene yarn at 300 ypm with the aluminum roll applicator heated at 127° C. Despite its low melting point, the polypropylene yarn processed completely satisfactorily, showing that the process of the invention is applicable even to low-melting fibers.

EXAMPLE 8

A 60-40 melt was made from 60 g of Polymer D of Example 1 and 40 g of succinic acid at a mixing temperature of 182° C. Sublimation was severe during the mixing, but the setting rate of the melt (melting point 134° C.) was even faster than a 60/40 mixture with adipic acid. A cast film was strong, flexible, and water-soluble.

EXAMPLE 9

A mixture of 25 g of adipic acid and 25 g of azelaic acid was melted with 50 g of Polymer C of Example 1 at 160° C. The Brookfield viscosity of the melt was 1000 cps at 154° C. The setting rate of the mixture, which melted at 110° C., was moderately fast, and the film was water soluble.

EXAMPLE 10

Melting 60 g of Polymer C of Example 1 and 40 g of benzoic acid at 150° C. produced considerable sublimation, but a cast film solidified moderately fast and was flexible and non-tacky. Its melting point was 95° C.

EXAMPLE 11

A mixture of 60 g of polymer C of Example 1 and 40 g of sorbitol was stirred together at 160° C. until homogeneous. The melt viscosity was high, 46,500 cps at 154° C., the composition melted at 75° C., and its setting rate was moderately fast. Applied to 22/1 65% polyester/35% cotton yarn, the melt produced good fiber lay, strength, and abrasion resistance. It was noted, in other runs, that extending the length of the melt period produced bubbling, evolution of water, and excessive viscosity, presumably because of undesired side reactions.

EXAMPLE 12

Exploratory efforts to utilize mannitol in the invention showed a pronounced tendency toward adverse effects if heating was over-extended. These effects took the form of bubbling, evolution of water and decreased solubility of the melt in water. Nevertheless, by starting at a high temperature (187° C.) and lowering the temperature to 170° C. as melting progressed, it was possible to melt 60 g of Polymer D of Example 1 and 40 g of mannitol to a homogeneous but very viscous liquid which was immediately cast as a film and molded to a rod. The film set very fast and was flexible, strong, and soluble in warm water (52° C.). Its melting point was 110° C. Applied to 1/27 polyester-wool yarn at 270 ypm, with the aluminum roll at 188° C., the size gave good fiber lay and no blocking in the package. Probably because of the high viscosity of the melt, with consequent tendency for the roll grooves to run only partially full, the size add-on was only 5.3%.

EXAMPLE 13

Another of the sugar alcohols, erythritol, 40 g, was melted with 60 g of Polymer D of Example 1 at 138° C. The Brookfield viscosity of the melt was 4400 cps at 154° C. There was no sublimation of the erythritol or other visible adverse effects. Cast as a film, the melt set moderately fast. The film was strong, flexible, and readily soluble in water.

EXAMPLE 14

A mixture using salicylic acid as the modifier was made by mixing 40 g of it with 60 g of Polymer C of Example 1. Rapid melting and mixing were necessary because of a strong bubbling tendency, believed due to evolution of water. The melt nevertheless, set up moderately fast to a yellowish, tack-free film.

EXAMPLE 15

Gentisic acid, 2,5-dihydroxybenzoic acid, 40 g, was melted with 60 g of Polymer C of Example 1. As in Example 14 with salicylic acid, this formulation required rapid melting to avoid excessive bubbling. The resulting yellowish-orange film was tack-free and moderately fast-setting.

EXAMPLE 16

When 40 g of 3,5-dihydroxybenzoic acid (alpha-resorcylic acid) was melted with 60 g of Polymer C of Example 1, the melt was surprisingly stable, especially in view of the high (240° C.) melting point of the acid. Mixing was achieved by starting at 225° C. and dropping the temperature to 190° C. as melting progressed. Only slight bubbling occurred. The yellow cast film set very fast and was non-tacky though somewhat brittle. It appears, in the class of phenolic acids at least, that the thermal stability of the modifier is of greater significance than its melting point.

EXAMPLE 17

A mixture of 40 g of 2,7-naphthalenediol and 60 g of polymer D of Example 1 was melted together at about the 190° C. melting point of the diol. Only minor sublimation occurred, but the color turned green. The melt had a Brookfield viscosity of 6250 cps at 170° C. and set very fast to a tack-free, strong, and moderately flexible film. The flexibility increased on conditioning overnight.

EXAMPLE 18

Monethyl terephthalate (0.4 g) was mixed thoroughly with 0.6 g of finely ground Polymer D of Example 1, and the mixture was heated at 180° C. in an oil bath while being stirred with a rod. Melting occurred in about 3 minutes. A small portion of the melt was spread on release paper, the resulting film being extremely fast-setting, flexible, and alkali-soluble. The melt was kept in the bath for about 30 minutes, during which time its solidifying properties were tested at intervals. No significant change was detected, this being taken as evidence of the thermal stability of both the half-ester and the blended composition.

EXAMPLE 19

Carboset 525 (40 g), a terpolymer made by B. F. Goodrich and analyzing 56% ethyl acrylate, 33% methyl methacrylate, and 11% methacrylic acid, was melted with 60 g of adipic acid at 182° C. The formulation, though rather viscous, was clear and nearly colorless. Cast in a rod and applied to yarn as in Example 2, the size proved fast-setting, flexible, non-tacky, and alkali- but not water-soluble. A melt made with 60% polymer and 40% adipic acid was too viscous to be effectively applied to yarn.

EXAMPLE 20

A bead-form copolymer (60 g) comprising vinyl acetate together with about 5.7% of crotonic acid, which copolymer may be made by the procedure of Example 1 of U.S. Pat. No. 2,966,480, was melted with 40 g of azelaic acid at 150° C., as rapidly as possible to minimize decomposition of the somewhat thermally unstable polymer. The Brookfield viscosity of the melt was 14,500 cps, and the setting rate was moderately fast. Applied to polyester/rayon yarn as in Example 2, at a 2.4% level, the size gave a yarn having added strength and very good fiber lay. It was easily removable with aqueous alkali.

EXAMPLE 21

To demonstrate the large-scale utilization of a preferred composition of the invention, 140 packages of 22/1, 65% polyester/35% rayon yarn were positioned on a yarn creel. The 140 yarn ends were pulled through an eyeboard in front of the creel and then through 140 1-inch 20-gauge tricot bar guides which were positioned ½ inch from the surface of a grooved aluminum roll. The 140 yarn ends were laid into every other slot of the bar guide. Each end was passed through its corresponding groove across the top arc of the aluminum applicator roll. The grooves, 15 mils wide at their tops, tapering to 10 mils at their rounded bottoms, were cut 10 grooves per inch. The surface temperature of the roll was 170° C., and the yarn speed was 300 ypm.

A large 60/40 melt blend of the Polymer C polyester of Example 1 and adipic acid was cast as a [178] ½×8×14-inch slab. The edge of the slab, at room temperature, was pushed against the face of the hot roll at a position of approximately 3 o'clock, at constant pressure, with the roll turning clockwise at 2¼ rpm, in the direction of yarn travel. Excess hot melt was wiped off at approximately 9 o'clock with a Teflon doctor blade. Only a few feet from the roll the yarn no longer felt tacky, showing that the size had quickly solidified at least on its surface. The yarn was then passed over an over-oiler, which applied about 1% of oil, and from there through a separating bar and a comb to draw the yarn shed down to 20 ends per inch. Takeup was on a 7-inch tricot beam located approximately 20 feet from the melt applicator. Multiple 7-inch tricot beams were combined to make a warp suitable for knitting or weaving.

The yarn, on examination, was found to have greatly improved fiber lay, a size level of 9% and increased tensile strength and abrasion resistance.

EXAMPLE 22

By way of contrast a run was made using Polymer D of Example 1 without a melt modifier of the invention. Cast as a standard rod, the polymer was pressed as usual against the 170° C. aluminum roll. The flow characteristics of the melt were poor and the grooves of the roll filled unevenly. The yarn, moving at 300 ypm, picked up the melt erratically, while the stringy adhesiveness of the melt tended to pull fibers from the body of the yarn, thereby creating a lint build-up problem. After passing over an over-oiler the yarn proceeded 25 feet to the takeup beam. It was found that virtually none of the desirable penetration of the yarn by size had occurred, and that the yarn blocked so badly on the beam that it had to be cut off.

EXAMPLE 23

Two grams of a low molecular weight, water-soluble polyurethane, made from toluenediisocyanate and an excess of a polyethylene glycol, was melted as a lubricant with 58 g of polymer C of Example 1 and 40 g of adipic acid. The resulting formulation was melt-applied to a 50-denier, 220-filament Dacron polyester yarn with 5½ turns per inch, at a 3% size level. The size had the effect of stabilizing the twist in the filament yarn, thereby protecting it from rolling, at the same time adhering the yarn bundle together to prevent filament flaring and strip-back in the loom. The slightly humectant properties of the polyurethane provided increased flexibility in the yarn after conditioning at 65% relative humidity.

EXAMPLE 24

A combination of 50 g of the Polymer D of Example 1, 44.25 g of adipic acid, 3.85 g of azelaic acid, and 1.9 g of Carbowax 6000, a polyethylene glycol lubricant, was melted together to give a hot melt size having a Brookfield viscosity of 850 cps at 134° C. This formulation was used to size a textured glass yarn on the grooved roll at 182° C. and 100 ypm. The sizing material, by bonding the glass yarn together, improved its knitting quality when it was knitted into a test sleeve.

The scope of the invention is defined in the following claims.

We claim:

1. A quick-setting non-aqueous water-extractable textile melt size composition comprising an intimate admixture of a water-soluble film-forming meltable thermoplastic polymer and a melt-miscible, solid modifier *having a melting point of at least about 90° C. and* selected from the class consisting of aliphatic *polycarboxylic acids* and *partial esters thereof,* aromatic [carboxylic] *monocarboxylic* acids, [partial esters thereof,] *partial esters of aromatic polycarboxylic acids,* non-polymeric polyhydric alcohols, phenolic acids, and polyhydric phenols, wherein the proportion of polymer to modifier is about 90:10 to about 50:50 on a weight basis, said size capable of being applied as a melt to textile yarns, with quick setting when exposed to ambient conditions, and capable of being removed from the yarns by aqueous or alkali extraction.

2. The size of claim 1 wherein the film-forming polymer is selected from the class of water- or aqueous alkali-soluble thermoplastic polymers consisting of sulfonated and phosphonated copolymers and their ammonium and metal salts, vinyl acetate copolymers, and acrylic and methacrylic acid copolymers.

3. The size of claim 2 further including a melt-miscible and aqueous-extractable yarn lubricant.

4. The size of claim 2 wherein the polymer is a water-soluble thermoplastic copolymer of isophthalic acid, 5-sulfoisophthalic acid or a salt thereof, and diethylene glycol, and the modifier is adipic acid, the polymer and acid being melt blended.

5. Yarn sized with the size of claim 1.

6. Yarn sized with the size of claim 2.

7. Yarn suitable for weaving sized with the size of claim 1.

8. A woven fabric made with the yarn of claim 7.

9. A yarn supply package containing the yarn of claim 7.

10. Yarn suitable for knitting sized with the size of claim 1.

11. A knitted fabric made with the yarn of claim 9.

12. A continuous filament yarn sized with the size of claim 1.

13. A spun yarn sized with the size of claim 1.

14. The spun yarn of claim 13 wherein the yarn contains polyester.

15. The spun yarn of claim 13 wherein the yarn contains rayon.

16. The spun yarn of claim 13 wherein the yarn is polyester and rayon.

17. The spun yarn of claim 13 wherein the yarn contains cotton.

18. The spun yarn of claim 13 wherein the yarn contains polyester and cotton.

19. The yarn of claim 5 wherein the yarn contains polypropylene.

20. The yarn of claim 5 wherein the yarn contains wool.

21. The yarn of claim 5 wherein the yarn contains glass.

22. A textured yarn sized with the size of claim 1.

23. In a process for sizing textile yarns by applying a size composition to textile yarn, the improvement comprising using, as said size composition, A quick-setting non-aqueous melt size composition comprising an intimate admixture of a film-forming water-soluble meltable thermoplastic polymer and a melt-miscible, solid modifier *having a melting point of at least about 90° C. and* selected from the class consisting of aliphatic *polycarboxylic acids* and *partial esters thereof,* aromatic [carboxylic] *monocarboxylic* acids, [partial esters thereof,] *partial esters of aromatic polycarboxylic acids,* non-polymeric polyhydric alcohols, phenolic acids, and polyhydric phenols, wherein the proportion of polymer to modifier is about 90:10 to about 50:50 on a weight basis, and applying the size composition to the textile yarn as a melt, wherein the size composition is characterized by a rapid setup and absence of tackiness when the sized yarn is led away from the point of application of the size composition to the yarn, the size composition being capable of removal from the textile yarn by aqueous extraction media.

24. The process of claim 23 wherein the polymer is selected from the class consisting of sulfonated and phosphonated copolymers and their ammonium and metal salts, vinyl acetate copolymers, and acrylic and methacrylic acid copolymers.

* * * * *